United States Patent
Ye et al.

(10) Patent No.: US 9,733,657 B2
(45) Date of Patent: Aug. 15, 2017

(54) POWER SYSTEM WITH AN ENERGY GENERATOR AND A HYBRID ENERGY STORAGE SYSTEM

(71) Applicant: NEC Laboratories America, Inc., Princeton, NJ (US)

(72) Inventors: Yanzhu Ye, San Jose, CA (US); Ratnesh Sharma, Fremont, CA (US)

(73) Assignee: NEC Corporation (JP)

( * ) Notice: Subject to any disclaimer, the term of this patent is extended or adjusted under 35 U.S.C. 154(b) by 603 days.

(21) Appl. No.: 14/292,851

(22) Filed: May 31, 2014

(65) Prior Publication Data

US 2015/0142190 A1 May 21, 2015

Related U.S. Application Data

(60) Provisional application No. 61/865,320, filed on Aug. 13, 2013, provisional application No. 61/871,963, filed on Aug. 30, 2013, provisional application No. 61/836,858, filed on Jun. 19, 2013.

(51) Int. Cl.
| | |
|---|---|
| *H02J 7/04* | (2006.01) |
| *G05F 1/66* | (2006.01) |
| *H02J 3/24* | (2006.01) |
| *H02J 3/32* | (2006.01) |
| *H02J 3/38* | (2006.01) |
| *H02J 7/34* | (2006.01) |
| *H02J 7/35* | (2006.01) |
| *G05B 15/02* | (2006.01) |
| *G06N 5/02* | (2006.01) |
| *G06N 7/02* | (2006.01) |

(52) U.S. Cl.
CPC ............... *G05F 1/66* (2013.01); *G05B 15/02* (2013.01); *G06N 5/027* (2013.01); *G06N 7/02* (2013.01); *H02J 3/24* (2013.01); *H02J 3/32* (2013.01); *H02J 3/383* (2013.01); *H02J 3/386* (2013.01); *H02J 7/34* (2013.01); *H02J 7/35* (2013.01); *Y02E 10/563* (2013.01); *Y02E 10/566* (2013.01); *Y02E 10/763* (2013.01); *Y02E 10/766* (2013.01); *Y02E 70/30* (2013.01); *Y10T 307/367* (2015.04)

(58) Field of Classification Search
CPC .... Y02E 60/12; G01R 31/3648; H01M 10/44; H02J 7/0031; H02J 7/0047
USPC ......................................................... 320/127
See application file for complete search history.

(56) References Cited

U.S. PATENT DOCUMENTS

| | | | | |
|---|---|---|---|---|
| 5,904,202 A | * | 5/1999 | Adamy ................ | B22D 11/16 164/151.4 |
| 2009/0114463 A1 | * | 5/2009 | DeVault ............... | B60K 6/365 180/65.29 |
| 2014/0057547 A1 | * | 2/2014 | Kang .................... | F24F 11/053 454/258 |

* cited by examiner

*Primary Examiner* — Arun Williams
(74) *Attorney, Agent, or Firm* — Joseph Kolodka

(57) ABSTRACT

Systems and methods are disclosed to control a power system with an energy generator and a hybrid energy storage system. The system includes two or more energy storage system, each with different energy storage capacity and energy discharge capacity. The system includes developing data for one or more control variables refined from expert knowledge, trials and tests; providing the control variables to a fuzzy logic controller with a rule base and membership functions; and controlling the energy generator and the hybrid energy storage system using the fuzzy logic controller.

18 Claims, 21 Drawing Sheets

FIG. 9A
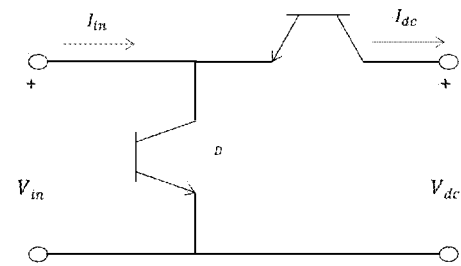
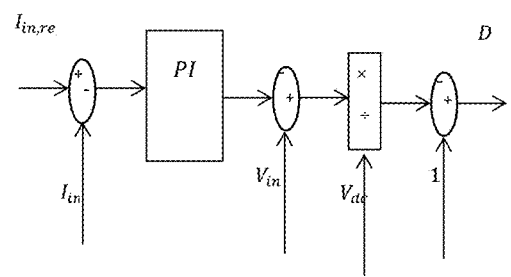
FIG. 9B
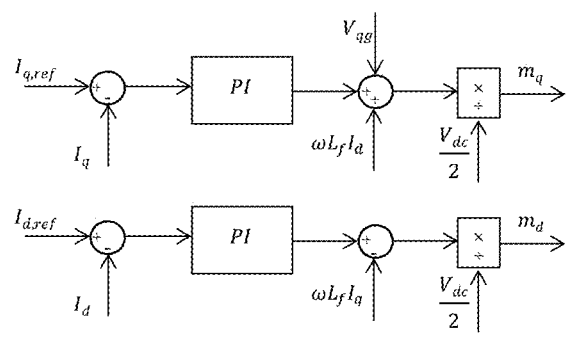
FIG. 9C

POWER SYSTEM WITH AN ENERGY GENERATOR AND A HYBRID ENERGY STORAGE SYSTEM

The present application claims priority to Provisional Applications 61/865,320 filed 2013, Aug. 13, 61/871,963 filed 2013, Aug. 8, and 61/836,858 filed 2013, Jun. 19, the contents of which are incorporated by reference.

BACKGROUND

The present invention relates to a power management system for an energy storage system.

With the high levels of penetrations of renewable energy resources in power grid, e.g. Photovoltaic (PV), the system encounters many challenges, e.g. power quality, voltage fluctuations, etc. One of the concerns comes from the short-term high-frequency variations of the PV generation during unpredictable sudden weather changes, which has been reported at some central generation stations. A great effort has been put in the mitigation of the short-term fluctuation of PV power generation, which is generally called as smoothing or ramp-rate control. The effective solution is to add energy storage device for PV integration.

The batteries, as the most common energy storage devices, have high energy density, but relatively low power density. Usually the PV power output smoothing requires frequent and high charging/discharging power from storage devices, which will greatly shorten the battery life. So the hybrid energy storage system is introduced to effectively utilize the characteristic of different storage devices. For example, the ultracapacitor (UC), featured with high power density and relatively low energy density, can compensate battery system and alleviate the high power pressure on battery system. However considering the expensive cost of these energy storage devices, the optimal power management strategy is necessary for the optimal use of these energy storage devices for certain system applications.

SUMMARY

In one aspect, a multilayer control framework for a power system includes a hybrid storage system (HSS) to store energy using a plurality of energy storage devices; a local controller coupled to the HSS to smooth output power of wind or photovoltaic energy sources while regulating a State of Charge (SoC) of the HSS; and a system-wide controller coupled to the HSS activated upon an occurrence of one or more energy disturbances with a control strategy to improve system dynamics to address the one or more energy disturbances.

In another aspect, a method to control a power system with an energy generator and a hybrid energy storage system including two or more energy storage system, each with different energy storage capacity and energy discharge capacity by developing data for one or more control variables refined from expert knowledge, trials and tests; providing the control variables to a fuzzy logic controller with a rule base and membership functions; and controlling the energy generator and the hybrid energy storage system using the fuzzy logic controller.

In another aspect, a hybrid ultra-capacitor (UC)-Battery storage system and advanced power management system are disclosed. A fuzzy logic controller is used to help smooth PV fluctuating power output and meanwhile optimize the storage component performance. The hybrid UC-battery energy storage system is integrated with PV generation system to help solve the fluctuating issues.

In another aspect, a power coordination system (PCS) is disclosed for handling power and energy sharing among energy storage devices, instead of the detailed control loops in those power electronics devices (e.g. converters, inverters). A fuzzy-logic-based integrated PCS is used to optimize the power/energy distributions among energy storage elements. The PCS has three layers. The first layer takes care of signal conditioning of storage device status. The second fuzzy-logic-based control layer implements the power coordination among the hybrid storage system by monitoring the operation status of all the energy storage devices and accounting for their dynamic characteristics. The third and final layer alters the controller operation rate to commensurate with the dynamic characteristics of these storage devices.

The preferred system offers the following advantages as the system:
1) Provides distributed control strategy of the HSS, no need for sophisticated communication network.
2) Provides faster operation control through the direct control upon power electronic interfaces
3) Avoids the need for sophisticated modeling and computing resources, easy for real-time implementation.
4) Provides a sustainable and safe operation of HSS
5) Increases reliability of entire micro-grid during islanding operation
6) Is easy for updating when different types of energy storage devices are applied, different component configuration (e.g. different unit size, different operation constraints, etc.)
7) Provides better utilization of storage devices.
8) Selects more practical signals as the control target which can be directly related with the dynamic characteristics and system operation performances.

BRIEF DESCRIPTION OF THE DRAWINGS

FIG. 2 shows an exemplary multi-layer control process for renewable Microgrid operation with the HSS, while

FIGS. 9A-9K show various exemplary control strategy of HSS in different operation modes in local control layer.

DESCRIPTION

A multilayer control framework for a hybrid storage system (HSS) is used to counteract power fluctuations and enhances system dynamics. The HSS consists of battery and supercapacitor bank. For local control, the system smooths the output power of wind or PV unit while regulating State of Charge (SoC) of battery and supercapacitor in range. For system-wide control layer, another control strategy is designed to improve system dynamics upon various disturbances, e.g. load switching, short circuit fault.

Figure 1:
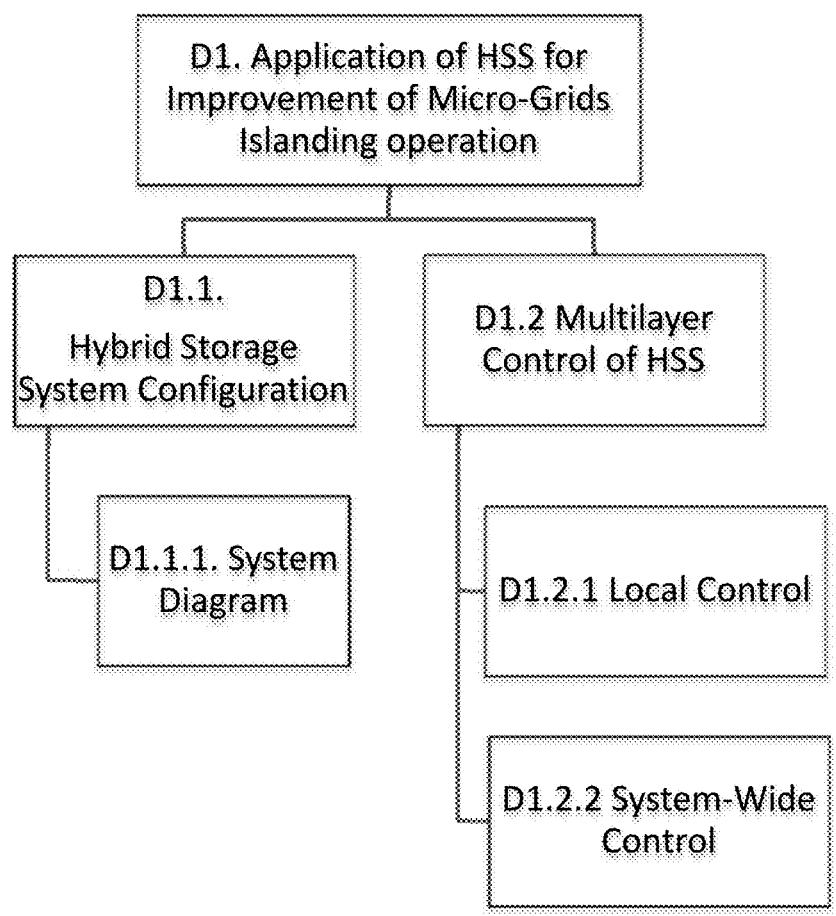
FIG. 1 shows an exemplary HSS control system.

FIG. 1 shows an exemplary HSS control system. D1 shows an exemplary application of HSS for Improvement of Micro-Grids Islanding operation. In D1.1, a Hybrid Storage System Configuration is determined with D1.1.1 System Diagram. In D1.2 and detailed below, a Multilayer Control of HSS is used with D1.2.1 Local Control and D1.2.2 System-Wide Control.

Figure 2:
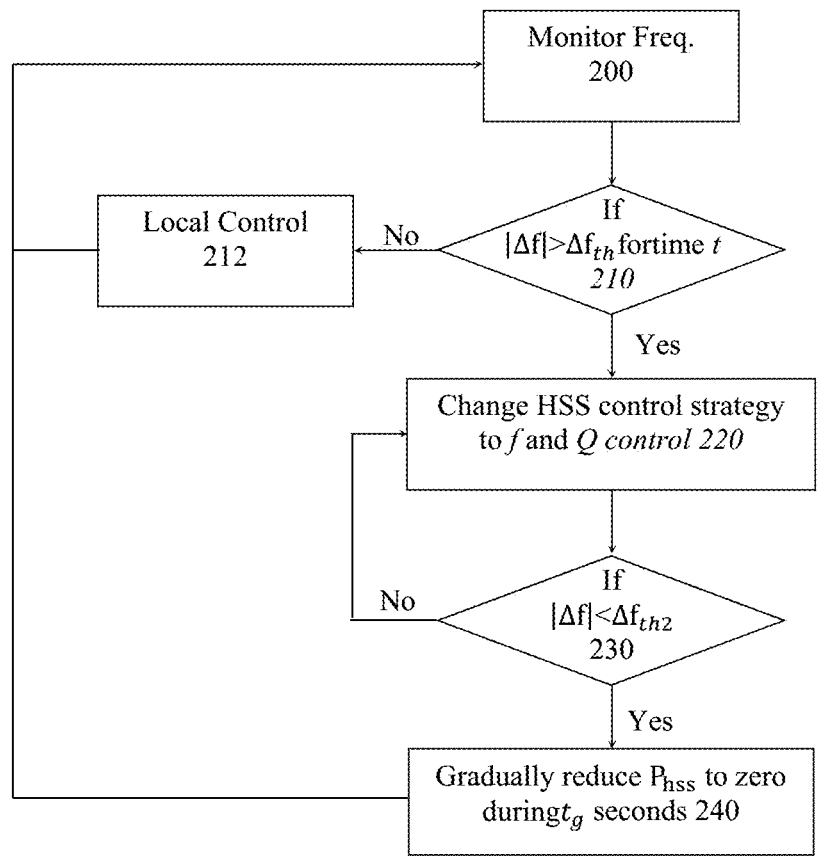

FIG. 2 shows an exemplary multi-layer control process for renewable Microgrid operation with the HSS. The process monitors the AC line frequency (200) and checks for frequency deviation from nominal value (210). If the frequency change is below a certain threshold, the process performs local control (212) and otherwise the process changes the HSS control mode to f and Q control (220). The process then checks if the frequency deviation is below a threshold (230) and if not the process loops back to 220 and otherwise the process proceeds to gradually reducing the power to zero over a predetermined period (240) and then loops back to 200 to monitor the frequency.

Figure 3:
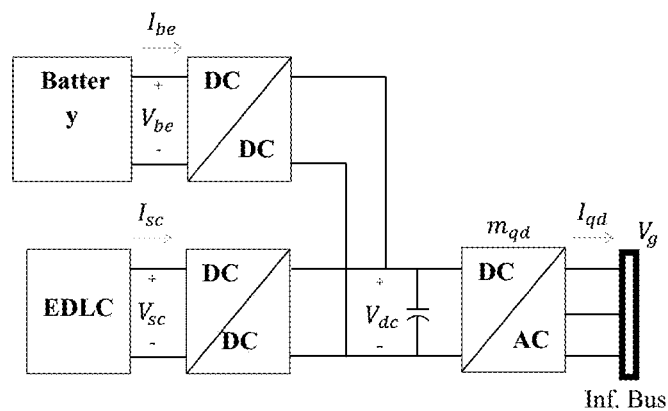
FIG. 3 shows an exemplary diagram of the HSS.
Figure 4:
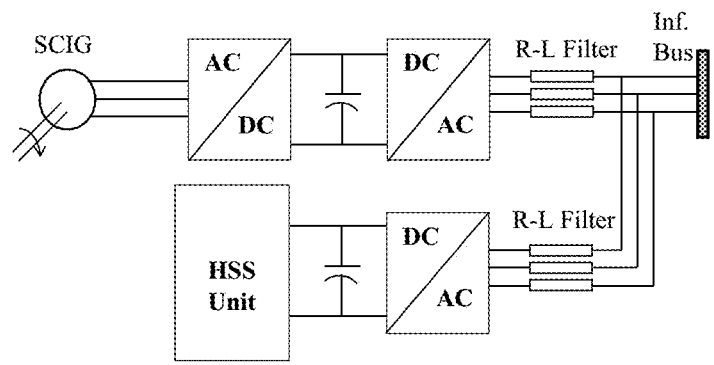
FIG. 4 shows an illustration of the integration of the HSS with the renewable energy resources can work with wind units.

The system also addresses output power smoothing of renewable energy resources, while targeting system dynamic improvement with an integrated control system. Other advantages may include:
- Distributed control strategy of the HSS for smoothing renewable power generation, no need for sophisticated communication network
- Faster operation control through the direct control upon power electronic interfaces
- No need for sophisticated modeling and computing resources, easy for real-time implementation.
- Provide a sustainable and safe operation of HSS
- Increases reliability of entire micro-grid during islanding operation FIG. 3 shows an exemplary schematic diagram of an HSS unit. The HSS consists of battery and an Electric Double-Layer Capacitor (EDLC) or super-capacitor or ultracapacitor, each one equipped with one DC/DC converter, connected to the grid through a DC/AC converter. The power flow of the HSS is driven by the control of these power electronic interfaces. The illustration of the integration of the HSS with the renewable energy resources can work with wind units as example in FIG. 4.

Figure 5:
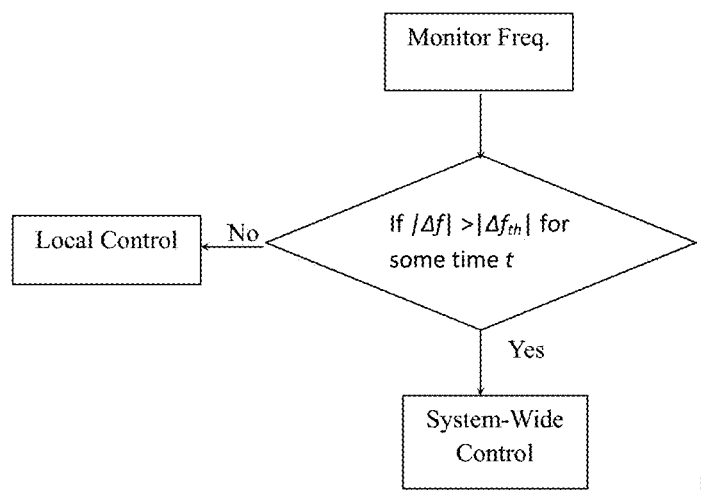
FIG. 5 shows a block diagram of a control scheme format where a disturbance is monitored and directly used as a control layer switching signal for HSS.

In D1.2, the Multilayer Control of HSS is detailed. Two layer of control is designed for HSS. The first layer is local control in which the main goal for HSS control is to smooth the output power of renewable source it is installed with. The second layer is system-wide control and it is activated following a disturbance. Here the frequency deviation is continuously monitored and used as the disturbance detection signal. If the frequency deviation is detected to be greater than a threshold value for some time, the HSS switches to system-wide control mode. If other format of disturbance signal is available, it can be directly used as the mode switching signal for HSS. A block diagram of this control scheme is shown in FIG. 5.

D1.2.1 shows a Local Control unit. For local control, the main goal for local control mode is to smooth the output power of renewable energy resource which HSS is connected to. A control system based on mode switching is used, each mode is activated based on state of charge of battery and supercapacitor. For each mode, different action sets are carefully defined in order to regulate the SoC of energy storage devices and maintain system performances.

Figure 6:
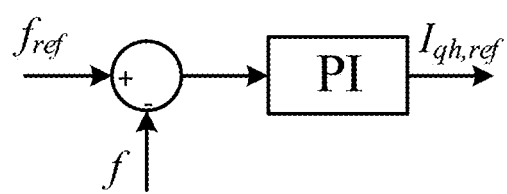
FIG. 6 shows an exemplary inverter control loop used in system-wide control layer.

D1.2.2 shows a System-Wide Control unit. Upon a disturbance, control strategy of DC/AC converter of HSS is changed to control the frequency of the system. Control loop for the Q-axis reference current for DC/AC inverter is shown in FIG. 6, which details a control loop to calculate $I_{qh,ref}$ in disturbance mode for frequency regulation.

A control scheme is also designed to co-ordinate the contribution of the SGs and HSSs for frequency recovery. Taking the load switching for example, since HSS units have quick dynamic responses and can compensate for load mismatch before the governor of SGs could catch up, the HSS units will take the major responsibility to bring the system frequency back to the nominal value. However, considering the limited capacity of HSS, the HSS units should not be active for a long period of time. Also the governor of synchronous generators is generally excited by the frequency deviation.

Figure 7:
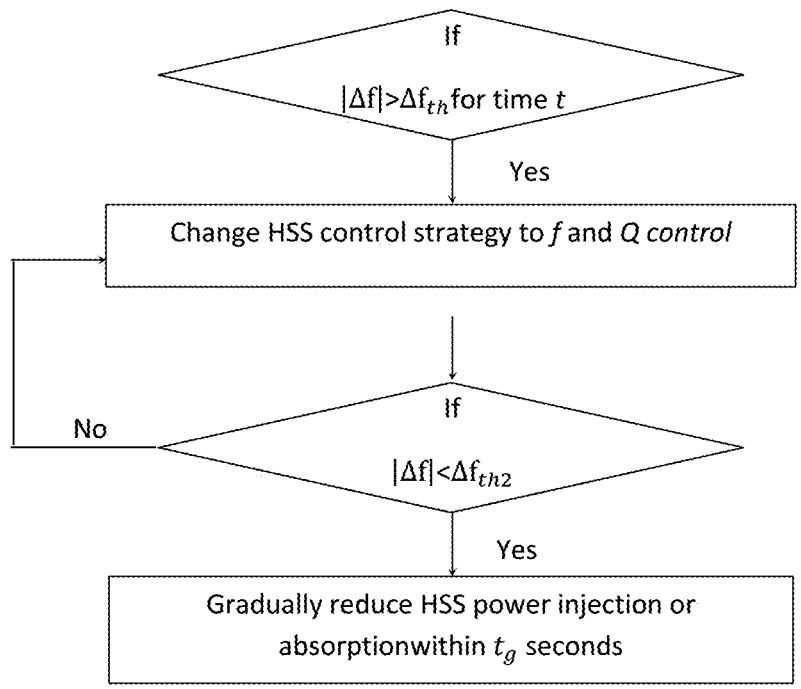
FIG. 7 shows an exemplary control scheme to co-ordinate the contribution of the SGs and HSSs for frequency recovery in system-wide control layer.
Figure 8:
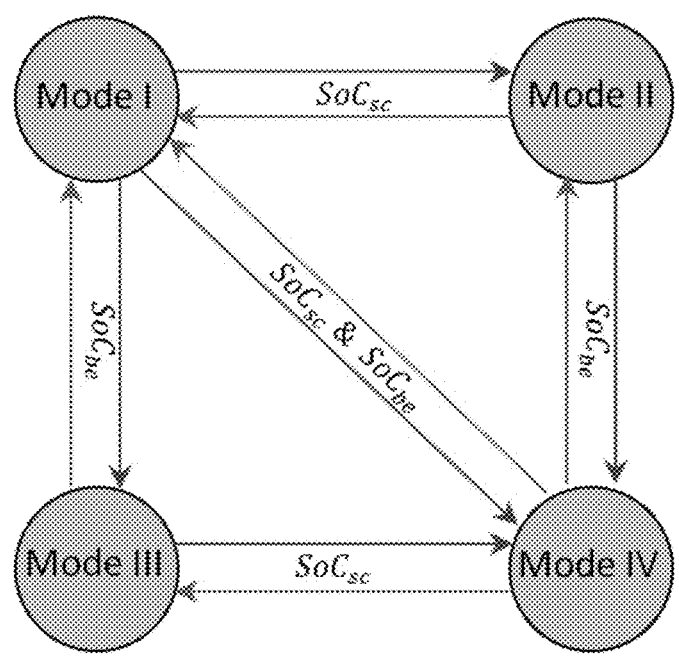
FIG. 8 shows an exemplary State Transition Diagram for different HSS operation modes in local control layer.

The flowchart is shown in FIG. 7. In this method, once the frequency deviation is over threshold ($\Delta f_{th}$) for some time t, the HSSs will switch to the system control mode and start to inject or absorb the power to the network for frequency recovery, while at the same time the governor of SGs are automatically excited to help frequency recovery at a slower pace than HSS. When frequency deviation drops less than threshold ($\Delta f_{th2}$), the HSS gradually fades out within $t_g$ seconds. $\Delta f_{th2}$ is chosen to be smaller than $\Delta f_{th}$. The time $t_g$ can be adjusted based on the speed of governors of SGs in the system. Through the aid of the HSS, the governor of SGs are provided sufficient time to compensate system frequency deviation. The advantages of the system may include:
1. Distributed control of HSS for smoothing renewable power generation, no need for sophisticated communication network
2. Monitors and regulates the energy state of different energy storage elements, and guarantee the safe operation of the entire HSS.
3. The direct control over converters utilizes the fast dynamic features of power electronic interfaces.
4. No need for sophisticated modeling and complicated computing resources, easy for real-time implementation.
5. An integrated solution for both renewable output power smoothing and system dynamic improvement In one embodiment, a hybrid Supercapacitor-Battery energy storage system topology and a robust control system with four different operation modes are used to smooth the output power of renewable resources while it keeps SoC of battery and supercapacitor in acceptable range and regulates the DC-link voltage of the entire hybrid storage unit. In each mode, a unique set of control strategies are selected for DC/DC converters of battery and supercapacitor as well as DC/AC converter of HSS. This method helps HSS to smooth output power at most of the times in addition to achieving other control goals, e.g. keep the SoC level of storage devices within normal range, maintain the DC-link voltage level. Advantages of the embodiment may include one or more of the following:
- Distributed control strategy of the HSS for smoothing renewable power generation, no need for sophisticated communication network
- Faster operation control through the direct control upon power electronic interfaces
- No need for sophisticated modeling and computing resources, easy for real-time implementation.
- Provide a sustainable and safe operation of HSS FIG. 8 shows an exemplary State Transition Diagram for four different HSS operation modes.

The HSS includes a battery and an Electric Double-Layer Capacitor (EDLC) or supercapacitor or ultracapacitor, each one equipped with a DC/DC converter, connected to the grid through a DC/AC converter. The power flow of the HSS is driven by the control of these power electronic interfaces. The illustration of the integration of the HSS with the renewable energy resources is shown above with the wind units as example.

The discharging/charging of the HSS is controlled directly through these power electronic interfaces of FIG. 9A, and these components are designed to operate under the inner current loop control. Currently control loop is done in FIG. 9B, and a DC/AC converter connects the entire HSS to the grid. The d-q axis current control loops for the converter are shown in FIG. 9C. In order to achieve sustainable and safe operation of HSS, the SoC of both battery and EDLC is monitored and maintained to ensure availability of capacity to absorb/inject power from/to the network. Also DC link voltage of the HSS should be regulated to avoid over/under voltage as it can damage the equipment and cause system malfunction. The control scheme allows the converters operate in four different modes based on different energy status of energy storage devices. The definitions of the four modes are given in Table 1. And the corresponding control strategies in different modes are summarized in Table 2. The details of each mode are given in the following sub-sections.

TABLE 1

Operation Mode Definition

| Mode | $SoC_{sc}$ | $SoC_{be}$ |
|---|---|---|
| I | In range | In range |
| II | Out of range | In range |
| III | In range | Out of range |
| IV | Out of range | Out of range |

TABLE 2

Control Strategies in each mode

| | Control Strategy | | |
|---|---|---|---|
| Mode | DC/DC EDLC | DC/DC Battery | DC/AC Inverter |
| I | $V_{dc}$ control | $SoC_{sc}$ control | P & Q control |
| II | $SoC_{sc}$ control | $V_{dc}$ control | P & Q control |
| III | $V_{dc}$ control | $SoC_{be}$ control | P & Q control |
| IV | $SoC_{sc}$ control | $SoC_{be}$ control | $V_{dc}$ & Q control |

When SoC of the battery and EDLC are both inside the acceptable range, Mode I (Normal Mode) mode is used. In this mode, the control strategy of each converter is as follows:
1) DC/DC converter of the EDLC regulates the DC-link voltage of HSS ($V_{dc}$).
2) DC/DC converter of the battery keeps SoC of the EDLC ($SoC_{sc}$) in range.
3) DC/AC converter controls the output active power of HSS ($P_{hss}$) to smooth the output power of renewable energy and reactive power of HSS ($Q_{hss}$).

Figure 9D:
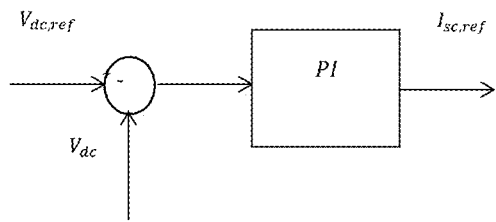

Control loop to calculate the reference current ($I_{sc,ref}$) for the EDLC DC/DC converter is shown in FIG. 9D.

Figure 9E:
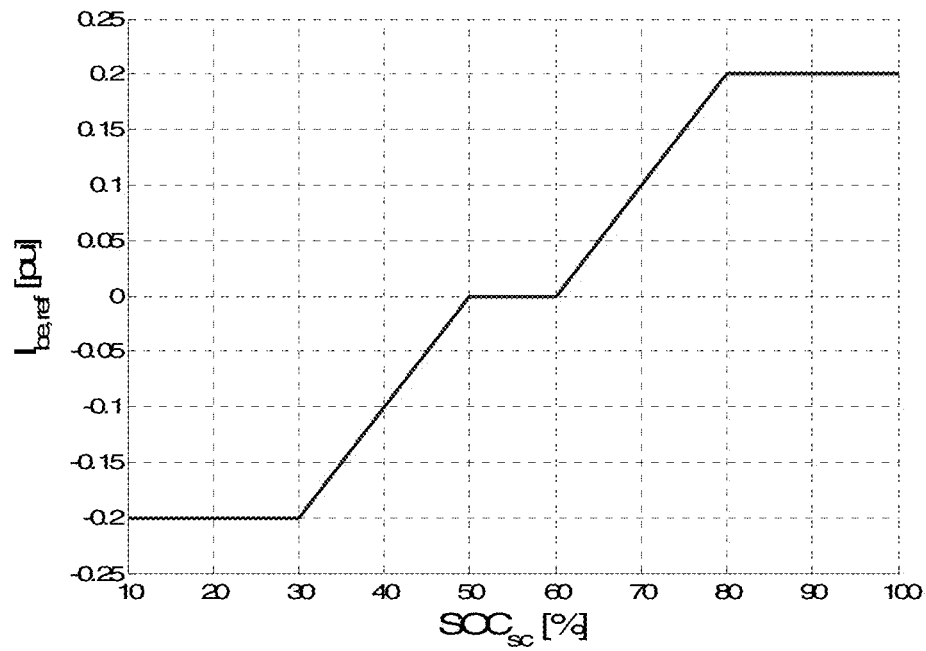

Reference current ($I_{be,ref}$) of the battery DC/DC converter to keep SoC of EDLC in range is obtained using the linear curve in FIG. 9E. Or the $I_{be,ref}$ can be related to the SoC of EDLC in a fuzzy way. Also, q- and d-axis reference currents for the DC/AC inverter are calculated as follows:

$$I_{q,ref} = \frac{2}{3} \cdot \frac{P_{hss,ref}}{V_{qg}} \quad \text{(Eq. 1)}$$

$$I_{d,ref} = \frac{2}{3} \cdot \frac{Q_{hss,ref}}{V_{qg}}. \quad \text{(Eq. 2)}$$

Figure 9F:
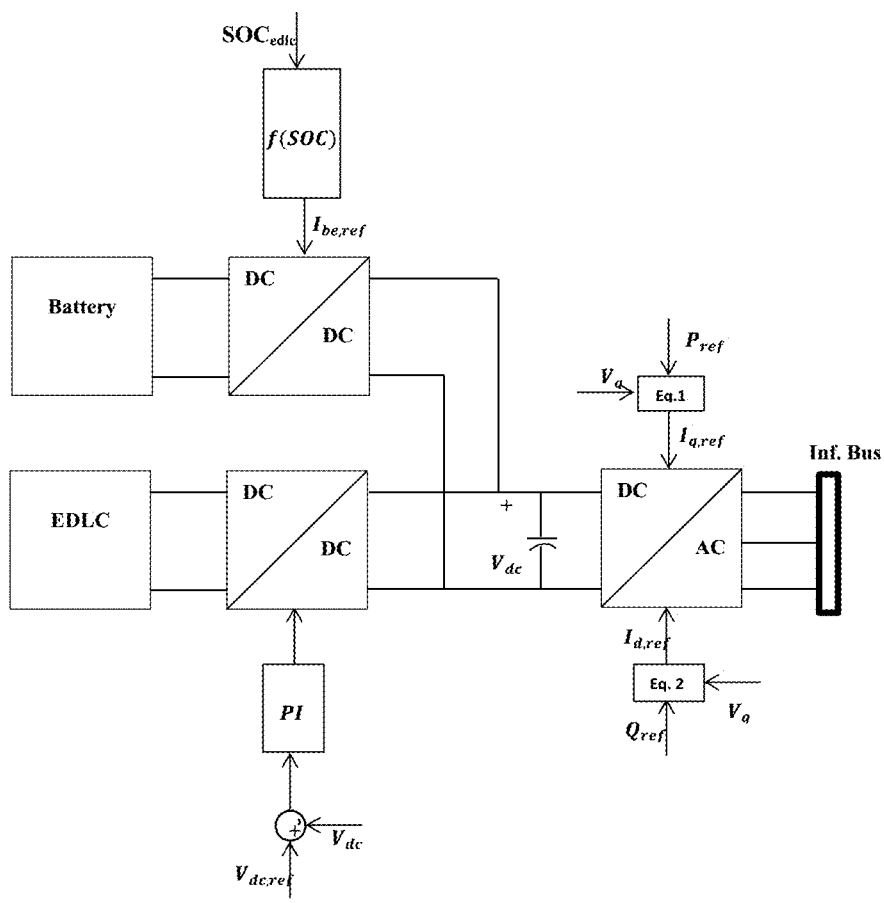

The control diagram of the entire HSS under mode I is shown in FIG. 9F.

Next, Mode II ($SoC_{sc}$ is out of range) is discussed. When SoC of EDLC is out of range, this mode is activated. In this mode, the following control strategies are used:
1) DC/DC converter of EDLC charges/discharges the EDLC based on the SoC of EDLC in order to bring the SoC of EDLC back to normal range. For example, when the SoC of the EDLC is the low boundary, the DC/DC converter will start to charge the EDLC, vice versa. The charging/discharging current can be set as a pre-determined constant value simply or determined by the SoC level and the current power demand.
2) DC/DC converter of battery regulates the DC-link voltage.
3) DC/AC converter still controls the output active power of HSS to smooth the output power of wind unit and reactive power of HSS (same as Mode I).

Figure 9G:
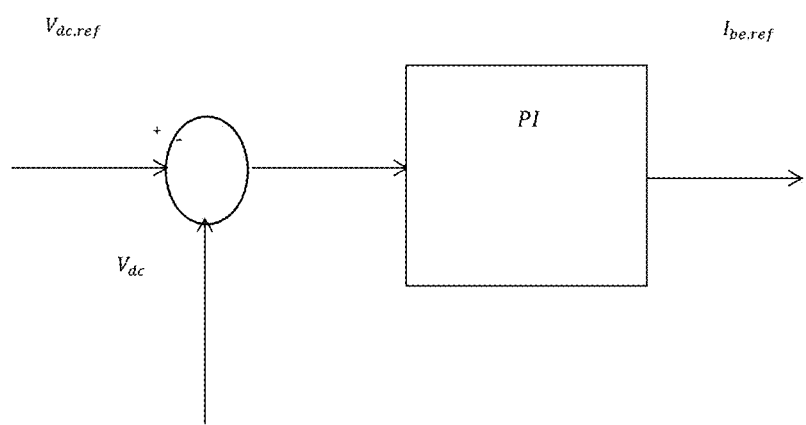
Figure 9H:
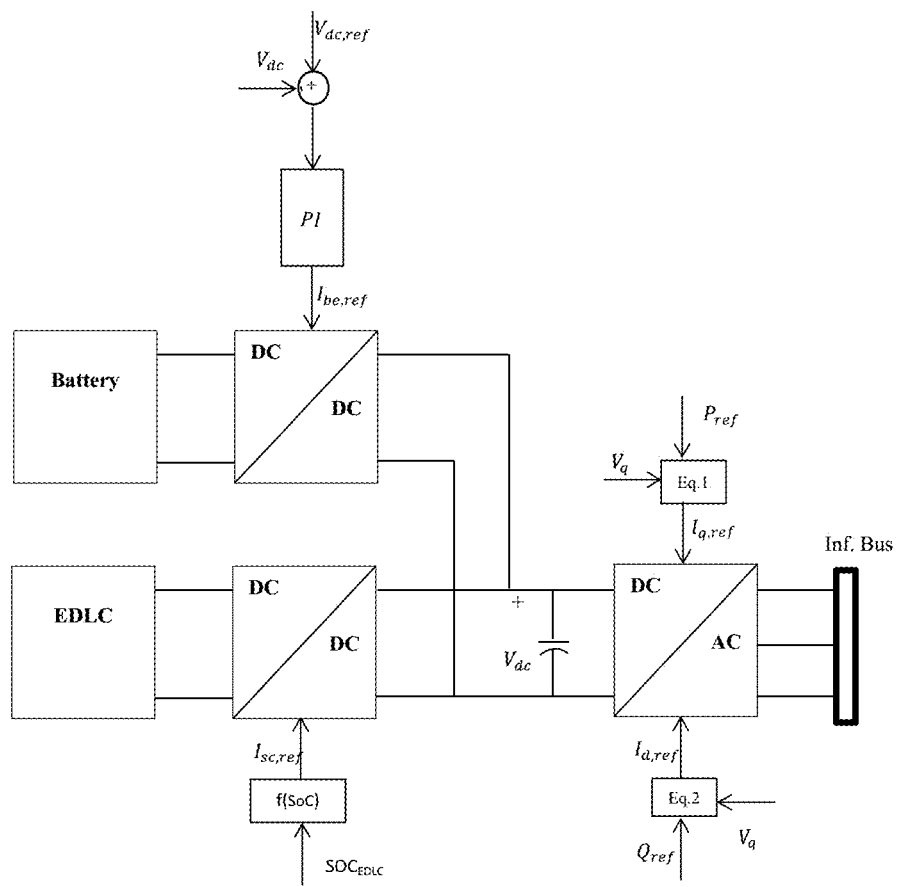

Control loop for calculating the reference current ($I_{be,ref}$) for battery DC/DC converter is shown FIG. 9G:

The reference current for the DC/AC inverter are obtained following the same equation in mode I. The control diagram of HSS in mode II is shown in FIG. 9H.

Next, Mode III ($SoC_{be}$ is out of range) is detailed. When SoC of battery is out of range Mode III is activated. In this mode control strategies are:
1) DC/DC converter of the EDLC regulates the DC-link voltage of HSS ($V_{dc}$).
2) DC/DC converter of battery charges/discharges the battery based on the SoC of battery in order to bring the SoC of battery back to normal status The charging/discharging current can be set as a pre-determined constant value or determined by the battery SoC level and the current power demand.
3) DC/AC converter controls the output active power of HSS to smooth the output power of wind unit and reactive power of HSS.

Figure 9I:
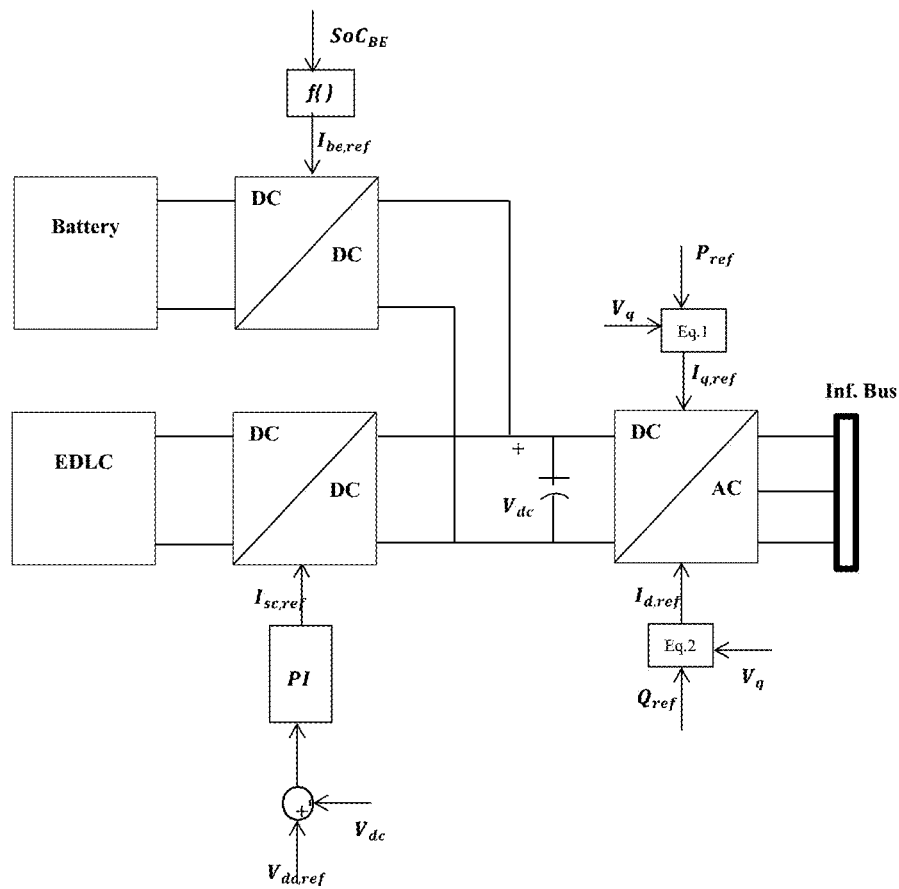

The reference current for the DC/AC inverter are obtained following the same equation in mode I. The control diagram of the entire HSS in mode III is shown in FIG. 9I.

Next, Mode IV ($SoC_{sc}$ and $SoC_{be}$ are out of range) is discussed. When SoC of both EDLC and battery are out of range this mode is activated. This mode is the only one in which HSS cannot smooth the output power. Control strategies of HSS in this mode are:

1) DC/DC converter of EDLC charges/discharges the EDLC based on the SoC of EDLC in order to bring the SoC of EDLC back to normal status. The charging/discharging current can be set as a pre-determined constant value or determined by the SoC level and the current power demand.
2) DC/DC converter of battery charges/discharges the battery based on the SoC of battery in order to bring the SoC of battery back to normal status. The charging/discharging current can be set as a pre-determined constant value or determined by the SoC level and the current power demand.
3) DC/AC converter regulates the DC-link voltage and controls the output reactive power of HSS.

Figure 9J:
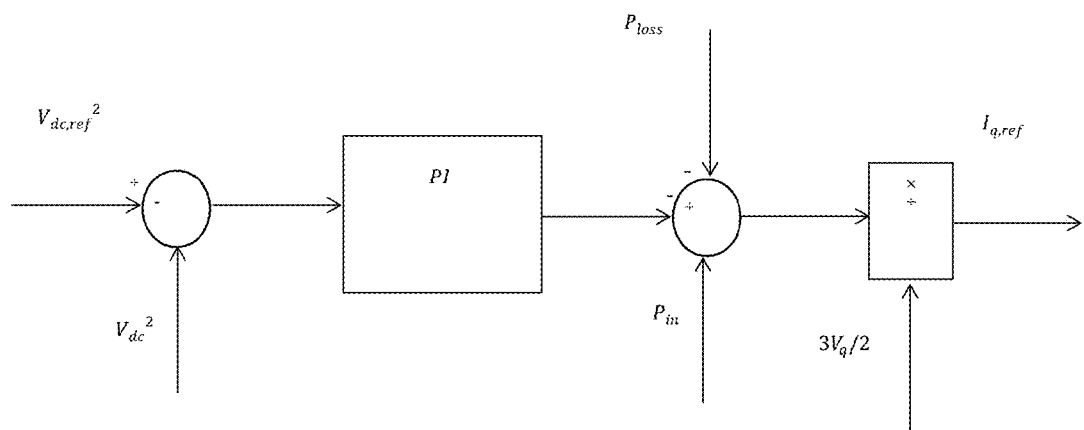
Figure 9K:
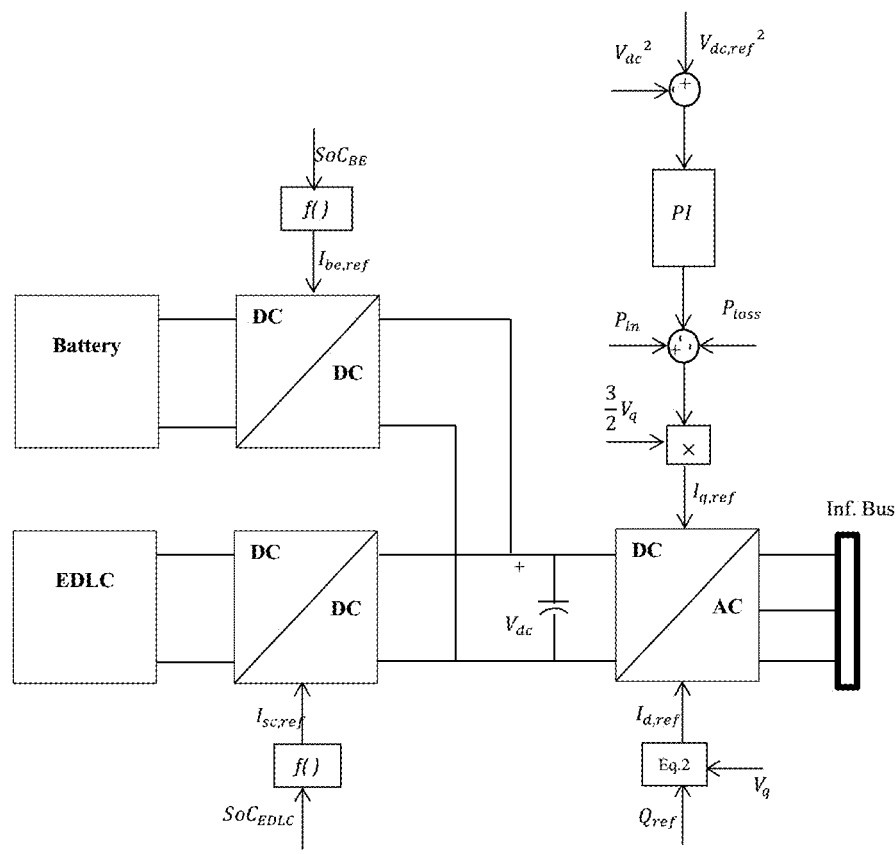

Control loop for calculating $I_{q,ref}$ for DC/AC inverter is shown in FIG. 9J for maintaining DC-link voltage. The control diagram of the entire HSS in mode IV is shown in FIG. 9K.

The system of FIGS. 7A-7B and FIGS. 8A-H [YY1] is advantageous in that it:

Distributed control of HSS for smoothing renewable power generation, no need for sophisticated communication network.

Monitors and maintains the energy state of different energy storage elements, and guarantee the safe operation of the entire HSS.

The converter mode switch strategy utilizes the fast dynamic features of the power electronic interfaces.

No need for sophisticated modeling and complicated computing resources, easy for real-time implementation.

Figure 10:
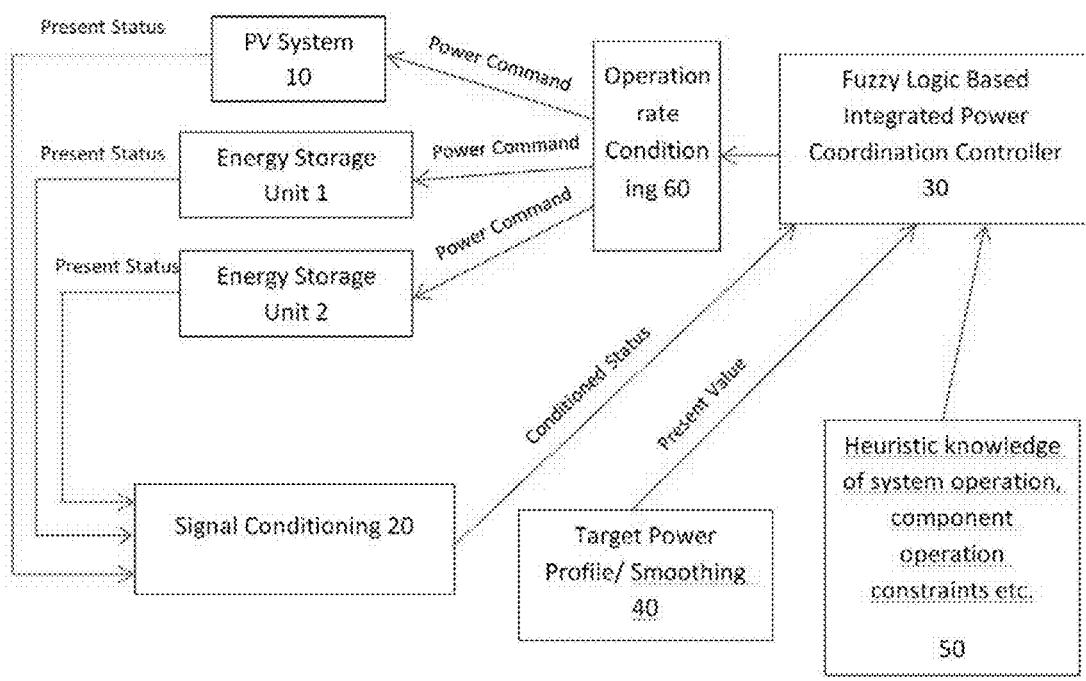
FIG. 10 shows an exemplary local control system to manage an energy source and a plurality of energy storage devices.

FIG. 10 shows an exemplary system to manage an energy source and a plurality of energy storage devices that form a hybrid storage system (HSS). The energy source in this embodiment is a PV with solar panels, and the energy storage devices 1 and 2 can be a low power density high energy density storage device such as a battery and a high power density low energy density storage device such as an ultracapacitor (UC), among others. The status of each component of the HSS and the PV 10 is captured by signal conditioning circuit 20 provided as input to a Fuzzy logic based controller 30 to provide an integrated power coordination and control. The Fuzzy controller 30 also receives as inputs a target power profile and smoothing data 40. Additionally, the Fuzzy controller 30 receives heuristic knowledge of system operation and component constraints from data block 50. The controller 30 in turns specifies an operating rate conditioning output 60 which is used to issue power commands to each of the components of FIG. 10.

Figure 11:
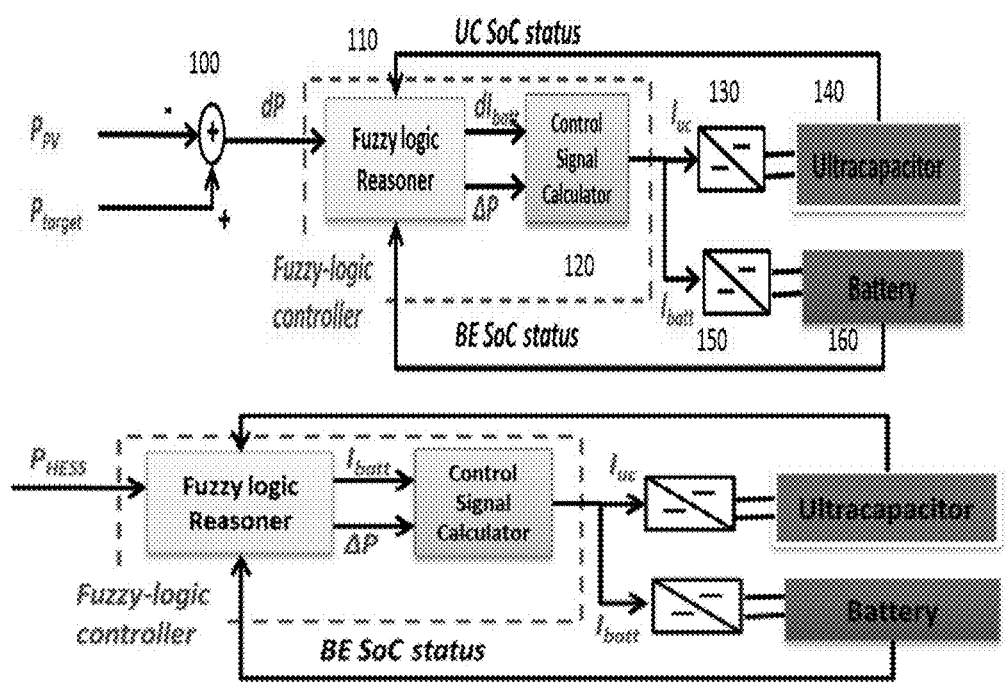
FIG. 11 shows an exemplary control diagram of integrated Fuzzy-logic controller of HSS.

FIG. 11 shows an exemplary control diagram of Fuzzy-logic controller. The Fuzzy logic controller translates expert knowledge into a set of "if-then" based fuzzy rules. Fuzzy control is effective when the system model is complex, non-linear or unclear. The fuzzy logic based power control acts as a master/supervisory controller which takes in several inputs and provides current references to coordinate power sharing between energy storage elements. In the past in hybrid energy storage systems, multiple fuzzy controllers have been used with each controller acting upon one energy storage element. This had a few disadvantages. The SOCs of BE and UC are controlled independently based on their own operating status. The mutual assistance between these two storage elements is not fully utilized, e.g. the battery should be operated as an auxiliary energy support for UC when the SoC of UC is approaching the boundary. The other disadvantage lies in the fact that these controllers adjust the target power based on SOC independently which modifies the output power profile in an uncontrollable way, in other words, the power smoothing performance will be compromised.

In this controller, all the information is taken into one fuzzy logic controller and control references for both BE and UC converters are generated simultaneously. This has a few advantages. The first advantage is that the controller is more aware or perceptive. Thus the principle of mutual assistance between different energy storage elements comes into play. This means that in moments of need, UC can be aided by BE based on BE's SOC. This helps to resurrect UC system in situations of low SOC where it can get cut-off. The second advantage is that the controller doesn't need a filter based approach as the power distribution baseline. This allows the controller to bring in BE into the picture only when the UC SOC becomes low. Thus, it minimizes battery operation times and potentially enhances its life cycles.

The power management system (PMS) combines the individual advantages of each single storage element. The design principle of the PMS is to operate the UC and battery in the way that not only the requested power demand of energy storage system is precisely provided and meanwhile the energy storage components are safely and sustainably operated within their operation limits. So the power sharing between battery and UC considers their current energy status (e.g. SoC), the total system power demand, their own characteristics, e.g. the physical energy/power capacity constraints, charging/discharging power constraints, etc. in real-time.

FIG. 12 shows the control diagram of fuzzy logic power controller with summer 100 determining difference between target power and PV power ($P_{HESS}$). The BE SOC, UC SOC and the difference between target power and PV power ($P_{HESS}$) are the inputs to a fuzzy logic reasoner 110. The BE reference current ($I_{bat}$) and deviation from target power ($\Delta P$) are the two outputs from the reasoner 110 of the fuzzy controller. A control signal calculator 120 generates the control reference signal at time t for the converter interface and drives unit 130 to charge or discharge the UC 140 as well as unit 150 to charge or discharge the battery following the equations below. The capacitor current reference is calculated from the power balance equation given below, where the losses in the system are ignored.

$$I_{UC}(t) = \frac{(P_{HESS}(t) - I_{bat}(t) \cdot V_{bat}(t) - \Delta P(t))}{V_{UC}(t)},$$

Where $P_{HESS}$ = Target Power – PV power

Here the battery current ($I_{batt}$) is defined as the primary control target, since the battery charging/discharging power is more constrained compared with UC and the way the battery is operated will greatly affect its life cycle. The control command ($I_{uc}$) for ultracapacitor at time instant t is then determined by the above power balance equation. Current limiters are also added, since both the battery and ultracapacitor has to operate within their current limits. The deviation from target power, $\Delta P$, is selected as the second output in order to manage the smoothing performances while helping maintain the SoC of energy storage elements in range.

The requested HESS power ($P_{HESS}$) can come from the upper system application level which is not the focus of this invention, e.g. PV power fluctuation smoothing, load following, voltage regulation, etc.

The fuzzy-logic controller is determined by the number and shape of the membership functions of each fuzzy variable as well as the selection of fuzzy rules. The fuzzy logic control block takes $SoC_{uc}$, $SoC_{be}$, and $P_{HESS}$ as the input variables. During the system operations, the UC SoC usually varies a lot and easily approach saturation or depletion when it is frequently active in responding to fast dynamic power requirement. While considering the good energy capacity of battery, the battery is designed to play the role of helping regulate the UC SoC in a smooth way. The rules are designed in the way: firstly the battery provides a low and smooth power supply; secondly the battery is acting as a complementary energy resources to help regulate the UC SoC when it is approaching the boundary; third, the UC shares more power when its SoC located in normal region to relieve the battery from high power demand.

The rule base is the expert knowledge translated to a set of rules to operate the system. These rules take into account system dynamics (BE/UC), constraints (SOC limit, charging/discharging power limit) and other practical aspects (mutual assistance). The following highlights the underlying motivation of the rule base:
 a) Maintain BE SoC within certain range where it has capacity to absorb and deliver energy.
 b) Maintain UC SoC within certain range where it can absorb as well as deliver power quickly
 c) Minimize the change in battery current
 d) Aid UC in cases where SOC of UC goes below the recommended lower value by additional discharging of BE
 e) Aid UC in cases where SOC of UC goes above the recommended higher value by additional charging of BE
 f) Slow down charging/discharging when close to upper/lower SOC limit to permit smooth SOC curves.

In order to coordinate power splitting between BE and UC, 125 rules have been defined. These rules have been represented in the tabular form in Table 3-Table 7.

Figure 12A:
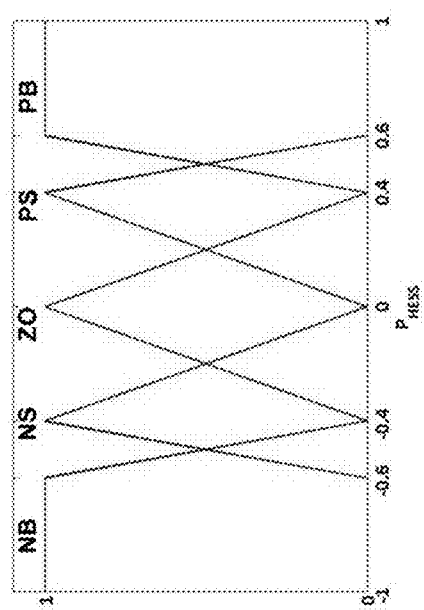
FIGS. 12A-12E show exemplary membership functions for the inputs and outputs of the Fuzzy logic controller.
Figure 12B:
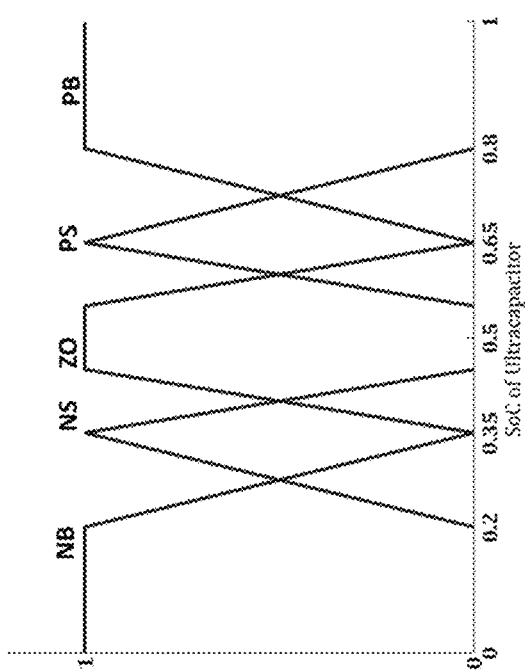
Figure 12C:
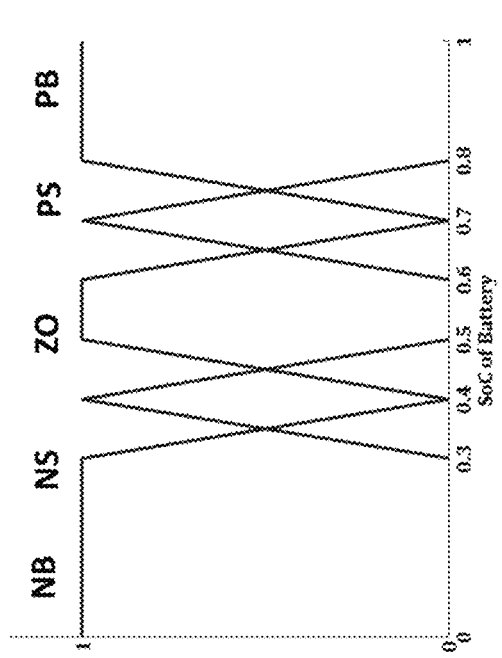
Figure 12D:
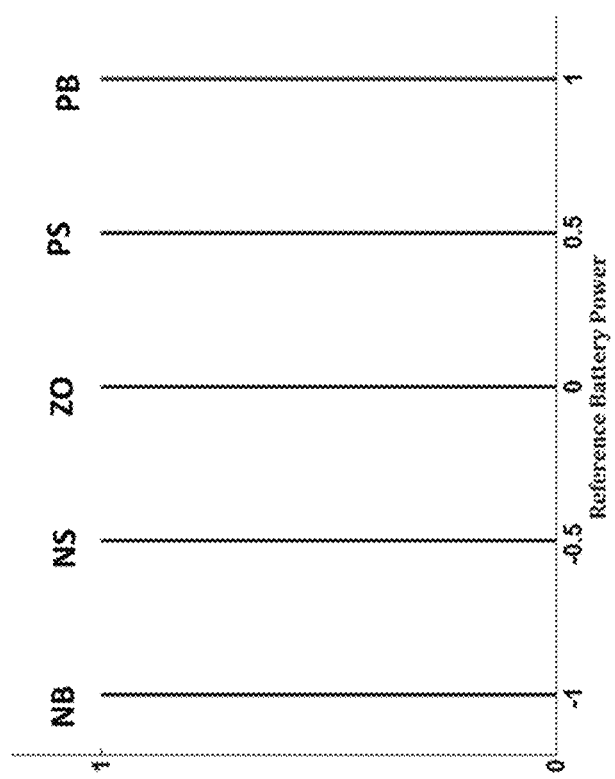
Figure 12E:
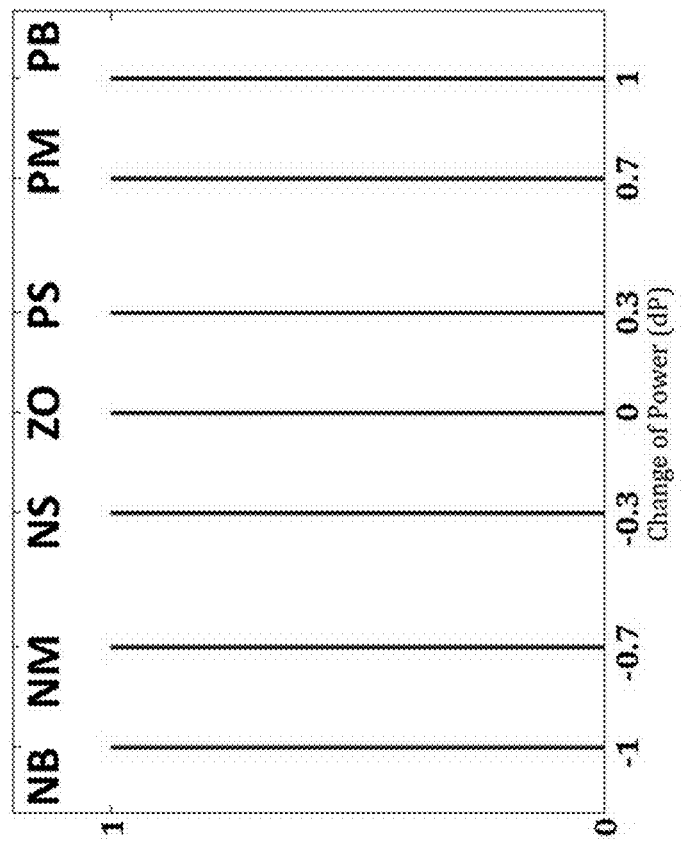

The membership functions for the inputs are as given in FIGS. 12A, 12B and 12C. The membership function for each fuzzy variable ensures that the sum of membership values of at any point is 1. So at each point sum of membership values of the crisp input is equal to 1. Logically it means that at each point the input completely belongs to one or more than one linguistic variables. The membership functions for the outputs are as given in FIG. 12D and FIG. 12E.

Figure 13:
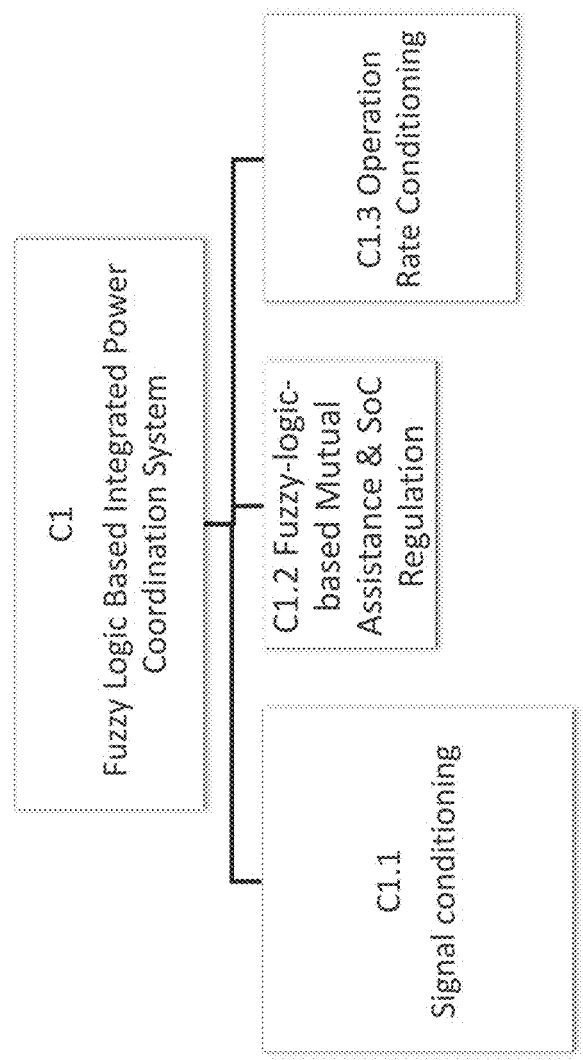
FIG. 13 shows an exemplary block diagram of Fuzzy Logic Based Integrated Power Coordination System.

FIG. 13 shows an exemplary block diagram of Fuzzy Logic Based Integrated Power Coordination System. In C1: Fuzzy Logic Based Integrated Power Coordination system, the fuzzy logic based control does not require extensive mathematical modeling. So the proposed control is a more general control. At the heart of the PCS is the rule base. Another integral part of the PCS is membership functions of control variables. This rule base and membership functions are developed and refined on the basis of expert knowledge, simulations and experiments.

In C1.1: Signal Conditioning, voltage and current measurements from any storage element can contain a lot of noise. The exponential Smoothing technique is used for suppressing the noise. The Exponential Smoothing can be expressed by $$y(t)=(a) \cdot x(t)+(1-a) \cdot y(t-1)$$

where x (t) is the input to the filter and y(t−1) is the output at previous time step (t−1). The advantage of using exponential smoothing instead of other filtering approaches like moving average, s-filter or even physical filter is the small time delay. All other filtering approaches introduce considerable time delay between the filtered signal and original signal. Exponential smoothing helps to minimize this time delay.

In C1.2: Fuzzy logic-based Mutual Assistance & SOC Regulation, hybrid energy storage is popular as it brings out the best characteristics of different types of energy storage elements. The presence of energy storage elements with different characteristics presents an opportunity for mutual assistance. For example, a low energy density source, like Ultra-capacitor, will be quickly depleted or overcharged. Once the SOC of ultracapacitor goes out of boundary, it will be put in stand-by mode. In such cases, the presence of a high energy density source, e.g. battery, can be used to charge the depleted ultracapacitor and bring it back into reliable operation range. Meanwhile, as the high power density energy component, the ultracapacitor can help alleviate the high power pressure on battery.

The system incorporates the mutual assistance through an integrated fuzzy logic controller. The details of the fuzzy-logic control design is elaborated in FIG. 11, and FIGS. 12A-12D, which includes the membership of the input/output variables and fuzzy rule. The operation of energy storage element within reliable SOC ranges prescribed by the manufacturer can prolong storage element's life.

In C1.3. Operation Rate Conditioning, the operation rate conditioning layer will alter the operation rate for different energy storage element based on their different dynamic characteristics. The power reference for UC and battery are updated at different operation rates ($f_{bat}$; $f_{uc}$), where $f_{bat} \ll f_{uc}$. The UC operates quickly to follow the fast system dynamics, while the reduced operation rate of battery accommodates the slow responding time of battery.

1. Three-layer Integrated Power Coordination System of the hybrid energy storage system primarily for PV output smoothing: the first layer provides data conditioning of input signals. The second layer computes the power command for different energy storage elements using fuzzy logic based on present status inputs from different components of the system. The third layer adapts the operation rates based on energy storage element characteristics.
2. The fuzzy-logic-based PCS does not require a precise mathematical modeling or sophisticated computations in most case, mainly relies on the on-line system measurements.
3. The fuzzy controllers used in the proposed PCS can be easily updated along with the changes in energy storage components (e.g. the unit size, the operational concerns.) through rule base and membership function updates.
4. Only one integrated fuzzy-logic-based controller is applied in PCS instead of separate power controllers for each energy storage element.

TABLE 3

SOC_BAT IS POSITIVE BIG

| | $P_{hess}$ | | | | | | | | |
|---|---|---|---|---|---|---|---|---|---|
| | PB | | PS | | Zero | | NS | | NB | |
| SOC_UC | Ibatt | dP | Ibatt | dP | Ibatt | dP | Ibatt | dP | Ibatt | dP |
| PB | Zero | Zero | Zero | Zero | NS | Zero | NB | NM | NB | NB |
| PS | Zero | Zero | Zero | Zero | Zero | Zero | NS | NS | NS | NM |
| Zero | Zero | Zero | Zero | Zero | Zero | Zero | Zero | Zero | Zero | Zero |
| NS | PS | Zero | PS | Zero | PS | Zero | PS | Zero | Zero | Zero |
| NB | PB | Zero | PB | Zero | PB | Zero | PS | Zero | PS | Zero |

TABLE 4

SOC_BAT IS POSITIVE SMALL

| | dP | | | | | | | | |
|---|---|---|---|---|---|---|---|---|---|
| | PB | | PS | | Zero | | NS | | NB | |
| SOC_UC | Ibatt | dP | Ibatt | dP | Ibatt | dP | Ibatt | dP | Ibatt | dP |
| PB | Zero | Zero | Zero | Zero | NS | Zero | NS | Zero | NB | NS |
| PS | Zero | Zero | Zero | Zero | NS | Zero | NS | Zero | NS | Zero |
| Zero | NS | Zero | Zero | Zero | Zero | Zero | Zero | Zero | Zero | Zero |
| NS | NB | Zero | PS | Zero | PS | Zero | PS | Zero | Zero | Zero |
| NB | NB | Zero | PB | Zero | PB | Zero | PS | Zero | PS | Zero |

TABLE 5

SOC_BAT IS ZERO

| | dP | | | | | | | | |
|---|---|---|---|---|---|---|---|---|---|
| | PB | | PS | | Zero | | NS | | NB | |
| SOC_UC | Ibatt | dP | Ibatt | dP | Ibatt | dP | Ibatt | dP | Ibatt | dP |
| PB | Zero | Zero | Zero | Zero | NS | Zero | NS | Zero | NB | Zero |
| PS | Zero | Zero | Zero | Zero | NS | Zero | NS | Zero | NS | Zero |
| Zero | Zero | Zero | Zero | Zero | Zero | Zero | Zero | Zero | Zero | Zero |
| NS | PS | Zero | PS | Zero | PS | Zero | PS | Zero | PS | Zero |
| NB | PB | Zero | PB | Zero | PB | Zero | PS | Zero | PS | Zero |

TABLE 6

SOC_BAT IS NEGATIVE SMALL

| | dP | | | | | | | | |
|---|---|---|---|---|---|---|---|---|---|
| | PB | | PS | | Zero | | NS | | NB | |
| SOC_UC | Ibatt | dP | Ibatt | dP | Ibatt | dP | Ibatt | dP | Ibatt | dP |
| PB | Zero | Zero | Zero | Zero | NS | Zero | NS | Zero | NB | Zero |
| PS | Zero | Zero | Zero | Zero | Zero | Zero | NS | Zero | NS | Zero |
| Zero | Zero | Zero | Zero | Zero | Zero | Zero | Zero | Zero | Zero | Zero |
| NS | PS | PM | PS | PS | Zero | Zero | Zero | Zero | Zero | Zero |
| NB | PB | PB | PB | PM | PS | Zero | Zero | Zero | Zero | Zero |

TABLE 7

SOC_BAT IS NEGATIVE BIG

| | dP | | | | | | | | |
|---|---|---|---|---|---|---|---|---|---|
| | PB | | PS | | Zero | | NS | | NB | |
| SOC_UC | Ibatt | dP | Ibatt | dP | Ibatt | dP | Ibatt | dP | Ibatt | dP |
| PB | Zero | Zero | Zero | Zero | NS | Zero | NS | Zero | NB | Zero |
| PS | Zero | Zero | Zero | Zero | Zero | Zero | NS | Zero | NS | Zero |

TABLE 7-continued

| | SOC_BAT IS NEGATIVE BIG | | | | | | | | | |
|---|---|---|---|---|---|---|---|---|---|---|
| | dP | | | | | | | | | |
| | PB | | PS | | Zero | | NS | | NB | |
| SOC_UC | Ibatt | dP | Ibatt | dP | Ibatt | dP | Ibatt | dP | Ibatt | dP |
| Zero | Zero | Zero | Zero | Zero | Zero | Zero | Zero | Zero | Zero | Zero |
| NS | Zero | PM | Zero | PS | Zero | Zero | Zero | Zero | Zero | Zero |
| NB | Zero | PB | PS | PM | Zero | Zero | Zero | Zero | Zero | Zero |

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A power system, comprising:
   an energy generator;
   a hybrid energy storage system (HSS) including two or more energy storage system, each with different energy capacity and power capacity; and
   a fuzzy logic controller with a rule base and membership functions for control variables refined from expert knowledge, trials and tests;
   wherein a exponential smoothing filter comprises $$y(t)=(a)\cdot x(t)+(1-a)\cdot y(t-1)$$

where x(t) is the input to the filter and y(t−1) is the output at previous time step (t−1).

2. The system of claim 1, wherein the controller uses an exponential smoothing filter for suppressing noise in voltage and current measurements.

3. The system of claim 1, comprising the fuzzy logic controller coupled to a hybrid energy storage system with a low energy density source coupled to a high energy density source.

4. The system of claim 3, wherein the fuzzy logic controller comprises first, second and third layer to control the hybrid energy storage system for photovoltaic output smoothing, wherein the first layer provides data conditioning of input signals, the second layer computes a power command for different energy storage elements using fuzzy logic based on present status inputs from each component of the hybrid energy storage system, and the third layer adapts operation rates based on energy storage element dynamic characteristics.

5. The system of claim 1, comprising an operation rate conditioning layer to alter an operation rate for different energy storage element based on their dynamic characteristics.

6. The system of claim 1, comprising a supercapacitor operated on a high rate with fast dynamic characteristics and a battery system operated at a low rate to reduce the number of micro-cycles during system operation.

7. The system of claim 1, wherein the fuzzy controller is updated along with the changes in energy storage components through rule base and membership function updates.

8. The system of claim 1, wherein the rule base includes rules to
   a) maintain BE in a range of SOC where it has capacity to absorb and deliver energy
   b) maintain UC in a range of SOC where it can absorb as well as deliver power quickly
   c) minimize the change in battery current
   d) aid UC in cases where SOC of UC goes below the recommended lower value by additional discharging of BE
   e) aid UC in cases where SOC of UC goes above the recommended higher value by additional charging of BE; and
   f) slow down charging/discharging when close to upper/lower SOC limit to permit smooth SOC curves.

9. A method to control a power system with an energy generator and a hybrid energy storage system including two or more energy storage system, each with different energy storage capacity and energy discharge capacity, comprising
   developing data for one or more control variables refined from expert knowledge, trials and tests;
   providing the control variables to a fuzzy logic controller with a rule base and membership functions; and
   controlling the energy generator and the hybrid energy storage system using the fuzzy logic controller;

wherein the exponential smoothing comprises $$y(t)=(a)\cdot x(t)+(1-a)\cdot y(t-1)$$

where x(t) is the input to the filter and y(t−1) is the output at previous time step (t−1).

10. The method of claim 9, comprising a supercapacitor operated on a high rate with a fast responding time and a battery system operated at a low rate to reduce the number of micro-cycles during system operation.

11. The method of claim 9, comprising updating the fuzzy controller and changes in energy storage components through rule base and membership function updates.

12. The method of claim 9, wherein the rule base includes rules to:
   maintain BE in a range of SOC where it has capacity to absorb and deliver energy;
   maintain UC in a range of SOC where it can absorb as well as deliver power quickly;
   minimize the change in battery current;
   aid UC in cases where SOC of UC goes below the recommended lower value by additional discharging of BE;
   aid UC in cases where SOC of UC goes above the recommended higher value by additional charging of BE; and
   slow down charging/discharging when close to upper/lower SOC limit to permit smooth SOC curves.

13. A power system, comprising:
   an energy generator;
   a hybrid energy storage system (HSS) including two or more energy storage system, each with different energy capacity and power capacity;
   a fuzzy logic controller with a rule base and membership functions for control variables refined from expert knowledge, trials and tests, the fuzzy logic controller coupled to a hybrid energy storage system with a low energy density source coupled to a high energy density source; and
   an ultra-capacitor coupled to a battery, wherein the ultracapacitor alleviates high power pressure on the battery and wherein the battery charges the ultracapacitor.

14. The method of claim 9, comprising an operation rate conditioning layer to alter an operation rate for different energy storage element based on dynamic characteristics.

15. The method of claim 9, comprising performing exponential smoothing for suppressing noise in voltage and current measurements.

16. The method of claim 9, wherein the HSS includes a low energy density source coupled to a high energy density source.

17. The method of claim 16, comprising executing rules in the fuzzy logic controller with first, second and third layer to control the hybrid energy storage system for photovoltaic output smoothing, wherein the first layer provides data conditioning of input signals, the second layer computes a power command for different energy storage elements using fuzzy logic based on present status inputs from each component of the hybrid energy storage system, and the third layer adapts operation rates based on energy storage element characteristics.

18. The method of claim 16, comprising an ultra-capacitor coupled to a battery, wherein the the ultracapacitor alleviates high power pressure on the battery and wherein the battery charges the ultracapacitor.

* * * * *